(12) United States Patent
Glickman et al.

(10) Patent No.: US 9,626,127 B2
(45) Date of Patent: Apr. 18, 2017

(54) INTEGRATED CIRCUIT DEVICE, DATA STORAGE ARRAY SYSTEM AND METHOD THEREFOR

(75) Inventors: Eran Glickman, Rishon Le Zion (IL); Ron Bar, Ramat Hasharon (IL); Benny Michalovich, Ra'anana (IL)

(73) Assignee: NXP USA, INC., Austin, TX (US)

( * ) Notice: Subject to any disclaimer, the term of this patent is extended or adjusted under 35 U.S.C. 154(b) by 363 days.

(21) Appl. No.: 13/810,350

(22) PCT Filed: Jul. 21, 2010

(86) PCT No.: PCT/IB2010/053328
§ 371 (c)(1),
(2), (4) Date: Jan. 15, 2013

(87) PCT Pub. No.: WO2012/010930
PCT Pub. Date: Jan. 26, 2012

(65) Prior Publication Data
US 2013/0117506 A1 May 9, 2013

(51) Int. Cl.
*G06F 12/00* (2006.01)
*G06F 12/08* (2016.01)
*G06F 3/06* (2006.01)
*G06F 11/10* (2006.01)

(52) U.S. Cl.
CPC ........ *G06F 3/0683* (2013.01); *G06F 11/1088* (2013.01)

(58) Field of Classification Search
CPC ............. G06F 12/0833; G06F 12/0866; G06F 12/0815; G06F 9/3017
USPC ........................................................ 711/114
See application file for complete search history.

(56) References Cited

U.S. PATENT DOCUMENTS

| 6,138,176 A | 10/2000 | McDonald et al. |
| 6,567,892 B1 | 5/2003 | Horst et al. |
| 6,578,108 B1 * | 6/2003 | Fujimoto ............... G06F 3/0607 711/114 |
| 6,904,498 B2 | 6/2005 | Stolowitz |
| 7,010,652 B2 | 3/2006 | Piccirillo et al. |
| 7,020,758 B2 * | 3/2006 | Fisk ......................... H04L 41/08 711/114 |

(Continued)

FOREIGN PATENT DOCUMENTS

JP 09-244932 A 9/1997

OTHER PUBLICATIONS

International Search Report and Written Opinion correlating to PCT/IB2010/053328 dated Sep. 12, 2012.

*Primary Examiner* — Yong Choe
*Assistant Examiner* — Mohamed Gebril

(57) ABSTRACT

An integrated circuit device comprises a data storage array controller for providing data storage array functionality for at least one data storage array. The data storage array controller comprises an address window controller arranged to receive at least one data storage device access command, and upon receipt of the at least one data storage device access command the address window controller is arranged to compare a target address of the at least one data storage device access command to an address window for a target storage device of the at least one data storage device access command, and if the target address is outside of the address window for the target storage device, block the at least one data storage device access command.

20 Claims, 6 Drawing Sheets

(56) References Cited

U.S. PATENT DOCUMENTS

| | | | | |
|---|---|---|---|---|
| 7,398,418 B2* | 7/2008 | Soran | G06F 3/0608 | 711/114 |
| 7,454,566 B1* | 11/2008 | Overby | G06F 3/0607 | 711/100 |
| 7,464,199 B2* | 12/2008 | Bissessur | G06F 13/28 | 710/22 |
| 7,882,307 B1* | 2/2011 | Wentzlaff | G06F 12/0813 | 711/119 |
| 7,971,025 B2* | 6/2011 | Murase | G06F 3/0607 | 711/161 |
| 8,041,890 B2 | 10/2011 | Wei | | |
| 8,332,594 B2* | 12/2012 | Borntraeger | G06F 12/109 | 711/147 |
| 8,499,114 B1* | 7/2013 | Vincent | G06F 9/5077 | 711/147 |
| 8,631,205 B1* | 1/2014 | Wentzlaff | G06F 12/0813 | 710/10 |
| 8,909,845 B1* | 12/2014 | Sobel | G06F 9/45558 | 711/154 |
| 2005/0268067 A1* | 12/2005 | Lee | G06F 12/10 | 711/202 |
| 2006/0047908 A1* | 3/2006 | Chikusa | G06F 3/0613 | 711/114 |
| 2007/0156951 A1* | 7/2007 | Sultan | G06F 11/1044 | 711/103 |
| 2008/0010419 A1* | 1/2008 | Kao | G06F 13/1694 | 711/154 |
| 2008/0010420 A1* | 1/2008 | Kao | G06F 12/0223 | 711/154 |
| 2008/0010500 A1* | 1/2008 | Shimmitsu | G06F 11/1662 | 714/6.32 |
| 2008/0263299 A1* | 10/2008 | Suzuki | G06F 11/1662 | 711/162 |
| 2009/0049264 A1* | 2/2009 | Resnick | G06F 12/0844 | 711/163 |
| 2009/0204872 A1* | 8/2009 | Yu | G06F 3/0613 | 714/773 |
| 2009/0240880 A1* | 9/2009 | Kawaguchi | G06F 3/0617 | 711/114 |
| 2010/0169401 A1* | 7/2010 | Gopal | G06F 7/02 | 708/316 |
| 2010/0281208 A1* | 11/2010 | Yang | G06F 3/0611 | 711/103 |
| 2010/0306174 A1* | 12/2010 | Otani | G06F 11/1464 | 707/640 |
| 2011/0185120 A1* | 7/2011 | Jess | G06F 3/061 | 711/114 |

* cited by examiner

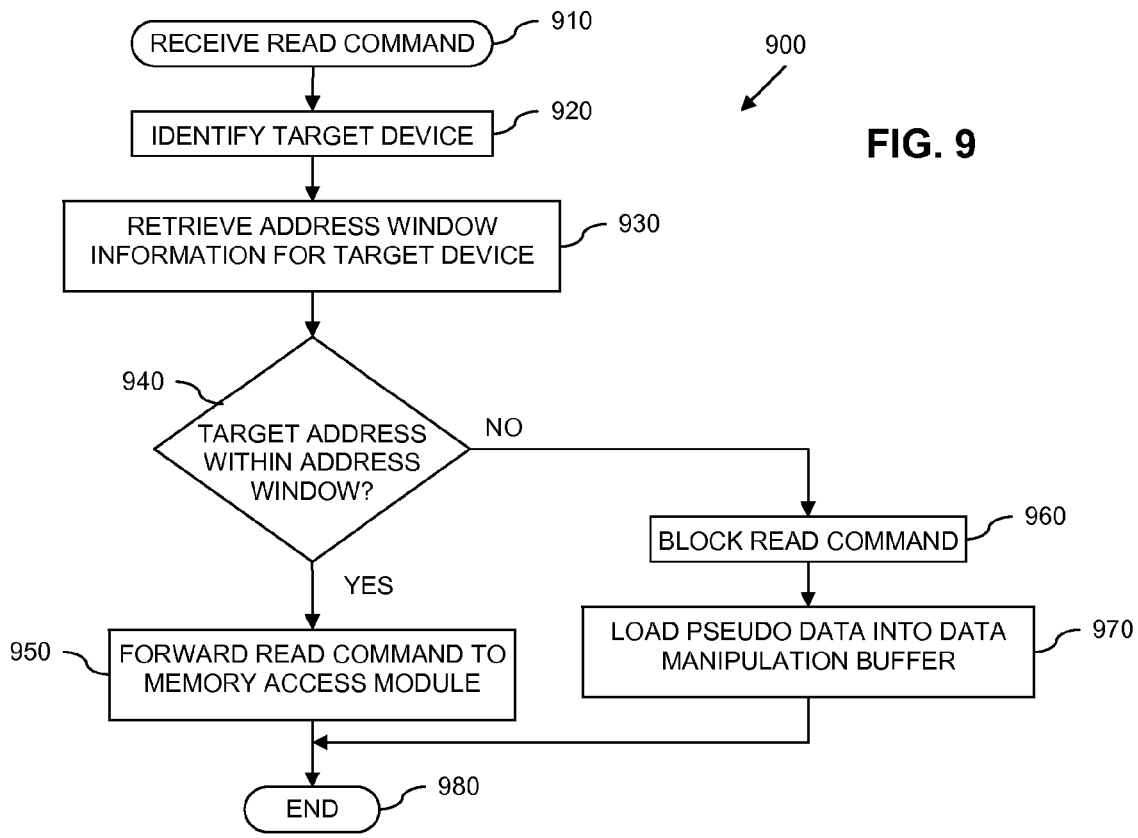
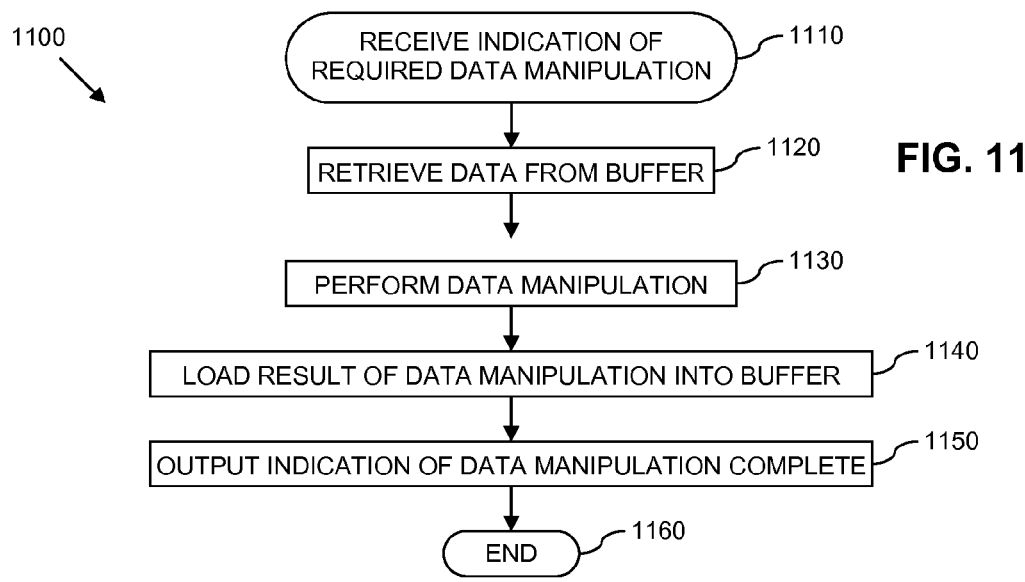

INTEGRATED CIRCUIT DEVICE, DATA STORAGE ARRAY SYSTEM AND METHOD THEREFOR

FIELD OF THE INVENTION

The field of this invention relates to an integrated circuit device, a data storage array system and a method therefor.

BACKGROUND OF THE INVENTION

Redundant Array of Independent/Inexpensive Disks (RAID) is a known technique for providing increased storage and/or reliability through redundancy, combining multiple (typically low-cost and therefore often less reliable) data storage devices, such as disk drives, into a single logical storage unit where all drives in the array are substantially independent. Various different RAID schemes have been defined whereby RAID units may divide and replicate data among multiple storage devices, and provide data protection for stored data, in a variety of different ways and configurations.

There are three key concepts used for RAID schemes: mirroring, where multiple disks contain identical data; striping, where sequential blocks of data are split among multiple disks; and error correction, where redundant parity data is stored to allow problems to be detected and possibly repaired. For example, FIG. 1 illustrates an example of an array 100 of N data storage devices 110 in which a RAID 5 scheme has been implemented. RAID 5 uses block-level striping with distributed parity. As such, and as illustrated in FIG. 1, data is 'striped' across the data storage devices 110, such that consecutive blocks of data 120 are distributed across N−1 of the data storage devices 110. A parity bit/word 125 for the striped blocks of data 120 is stored in the $N^{th}$ data storage device. The parity bits/words for the stripes of blocks of data are distributed over the N data storage devices 110, as opposed to being stored within a single, dedicated, data storage device. The use of parity bits/words in this manner enables data to be recoverable in the event that a data storage device 110 becomes 'unavailable', for example should the data storage device 110 become faulty or be physically removed or disconnected. Furthermore, by distributing the parity bits/words across the data storage devices 110 in the manner illustrated in FIG. 1, retrieving the parity data is less prone to process speed bottlenecks caused by having to read the parity data from a single device, since multiple read operations from the multiple data storage devices 110 may be performed substantially simultaneously. Accordingly, the process of recovering data is less time consuming.

However, an inherent limitation of such a RAID 5 scheme is that all but one of the data storage devices 110 is required to be present in order to recover data. Consequently, if more than one data storage device becomes unavailable (e.g. faulty), it will not be possible to recover the data. When a data storage device becomes 'unavailable', e.g. develops a fault or the like, the data stored in the unavailable device must be recovered using the data and parity bits/words stored in the remaining data storage devices, and the entire 'database' must be rebuilt. Specifically, all of the data stored within the array 100 must be re-written to the remaining data storage devices, and the parity bits/words re-generated. This is required to be performed before any new data may be written to the array. An extension of traditional RAID 5 schemes is RAID 6, which comprises the use of double distributed parity blocks (e.g. using a Galois calculation), whereby fault tolerance is provided from two data storage device failures.

With the increasing sizes of data storage devices, the time taken to perform such data recovery is becoming increasingly longer. Furthermore, with the demand for the number of data storage devices within an array increasing, the frequency with which data storage devices become 'unavailable' (e.g. through device failure) is also increasing. Accordingly, there is a need to minimize the time taken to perform data recovery and to enable operation of the array to resume.

However, once data from a 'lost' data storage device has been recovered, data and the corresponding parity bits/words cannot simply be re-written to the remaining data storage devices using, say, the existing RAID command stack. This is due to the RAID algorithms, etc., being configured for an array of N data storage devices. Thus, following such data recovery the array will only comprise 'N−1' available data storage devices until the lost data storage device is repaired or replaced. Accordingly, it is necessary for the RAID algorithms, etc., to be reconfigured. In the case of a hardware implementation of a RAID controller, this typically requires the entire RAID command stack to be re-written, which must be performed by way of software executing on, for example, a central processing unit (CPU) of the system. Such a rewriting of the RAID command stack is an exhaustive and time consuming process, not only delaying the return to operation of the array, but also consuming valuable system processing resources.

Due to the complexities of the operations required to be performed by RAID algorithms, and the typically limited resources available to them, known RAID controllers are also limited to use with data storage devices comprising equal size data storage capacities.

SUMMARY OF THE INVENTION

The present invention provides an integrated circuit device, a data storage array system and a method for providing data storage array functionality for at least one data storage array as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIGS. 6 to 11 illustrate simplified flowcharts of parts of an example of a method for providing data storage array functionality.

DETAILED DESCRIPTION

Example embodiments of the present invention will now be described with reference to a Redundant Array of Independent/Inexpensive Disks (RAID) system and a method therefor. However, the present invention is not limited solely to being implemented within such a RAID system, and example embodiments of the present invention may be implemented within any suitable data storage array system.

Furthermore, because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In summary, there is provided a method and apparatus for providing data storage array functionality for at least one data storage array. In accordance with some examples, there is provided an integrated circuit device comprising a data storage array controller for providing data storage array functionality for at least one data storage array. The data storage array controller comprises an address window controller arranged to receive data storage device access commands, and the address window controller is arranged to, upon receipt of a data storage device access command, compare a target address of the data storage device access command to an address window for a target storage device of the data storage device access command, and if the target address is outside of the address window for the target storage device, to block the data storage device access command and, for example, replace it by a known command and/or configuration.

Figure 1:
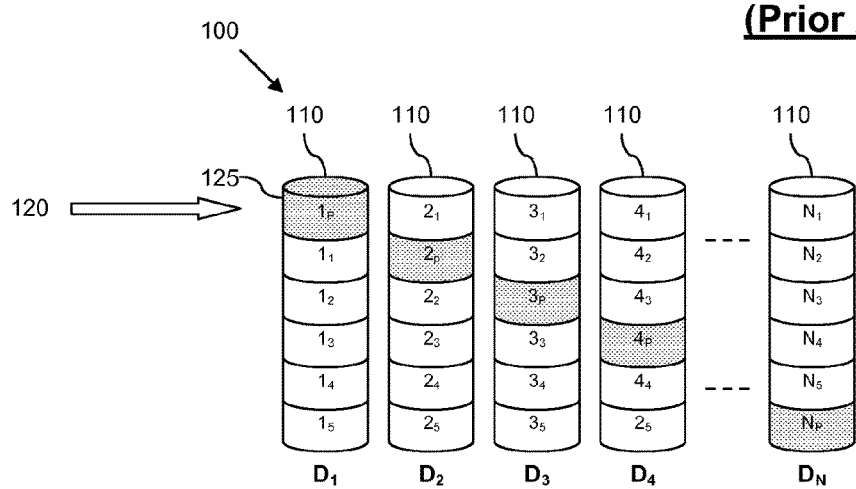
FIG. 1 illustrates a known example of an array of data storage devices.
Figure 2:
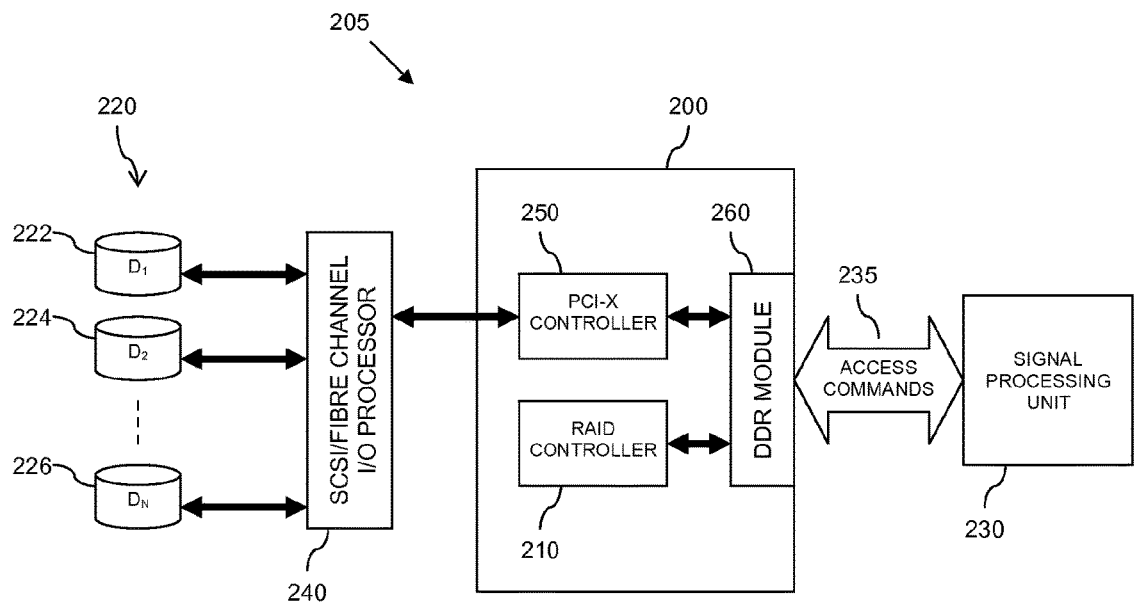
FIG. 2 illustrates an example of a data storage array system.

Referring now to FIG. 2, there is illustrated an example of a data storage array system 205 adapted in accordance with some example embodiments of the present invention. The data storage array system 205 comprises an array 220 of N data storage devices 222, 224, 226. The data storage devices may comprise any suitable type of data storage devices, such as optical and/or magnetic disk storage devices, Flash memory storage devices, etc. A signal processing module 230 arranged to execute application program code and the like is able to access the data storage devices 222, 224, 226 by providing array access commands 235 to a data access module 260, which for the illustrated example comprises a double data rate (DDR) module 260. A data storage array controller 210 is operably coupled to the DDR module 260, and arranged to receive the array access commands 235, and to perform data storage array functionality in accordance with the received access commands. Such data storage array functionality may comprise, by way of example, reading and/or writing data from/to one or more of the data storage devices 222, 224, 226. Accordingly, the data storage array controller 210 is further arranged to provide data storage device access commands to the DDR module 260 to perform read and/or write access operations from/to one or more of the data storage devices 222, 224, 226 within the data storage array 220. For completeness, the DDR module 260 is further coupled to a PCI-X controller 250 to which the DDR module 260 forwards data storage device access commands received from the data storage array controller 210, and from which it receives the results thereof and passes back to the data storage array controller 210. For the illustrated example, the data storage devices 222, 224, 226 are operably coupled to the rest of the data storage array system 205 via a bus controller 240, which for the example illustrated in FIG. 2 comprises a SCSI (Small Computer System Interface)/Fibre Channel input/output processor. The bus controller 240 is in turn operably coupled to the PCI-X controller 250, as illustrated in this example.

Figure 3:
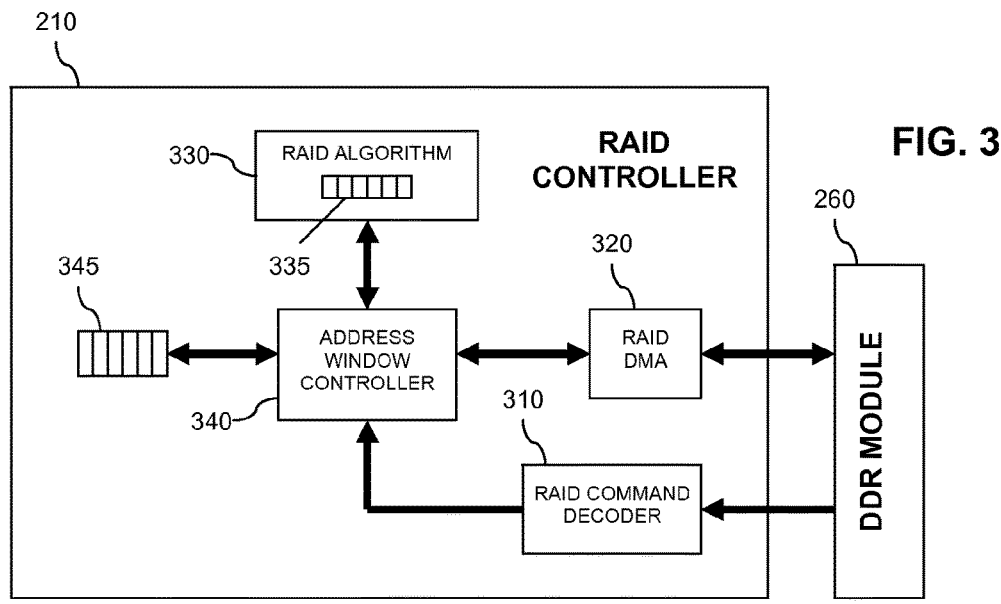
FIG. 3 illustrates an example of a data storage array controller.

Referring now to FIG. 3, there is illustrated an example of the data storage array controller 210 of FIG. 2 in more detail. For the illustrated example, the data storage array system comprises a RAID system, and as such a data storage array controller 210 comprises a RAID controller, and more specifically, for the illustrated example, a hardware implementation of a RAID controller. For the example illustrated in FIG. 3, the RAID controller 210 comprises a command decoder 310 arranged to receive array access commands from, for the illustrated example, the DDR module 260, and upon receipt of an array access command to generate at least one data storage device access command in accordance with the received array access command. The RAID controller 210 further comprises a memory access module 320 arranged to receive data storage device access commands generated by the RAID command decoder 310 and to perform access operations to/from the at least one data storage array such as data storage array 220 of FIG. 2, in accordance with the received data storage device access commands. For the illustrated example, the memory access module 320 comprises a direct memory access (DMA) module, and is arranged to perform access operations by providing read/write commands for data storage devices 222, 224, 226 of FIG. 2 within the data storage array 220 to the DDR module 260, and to receive responses to such commands back therefrom. The RAID controller 210 further comprises a data manipulation module 330 arranged to perform data manipulation in accordance with received array access commands. For the illustrated example, the data manipulation module 330 comprises a RAID algorithm module, and may be arranged to perform on data made available there to, in accordance with received array access commands, one or more of: data protection; code generation; data recovery; data mirroring; data striping; data redundancy; etc.

Figure 4:
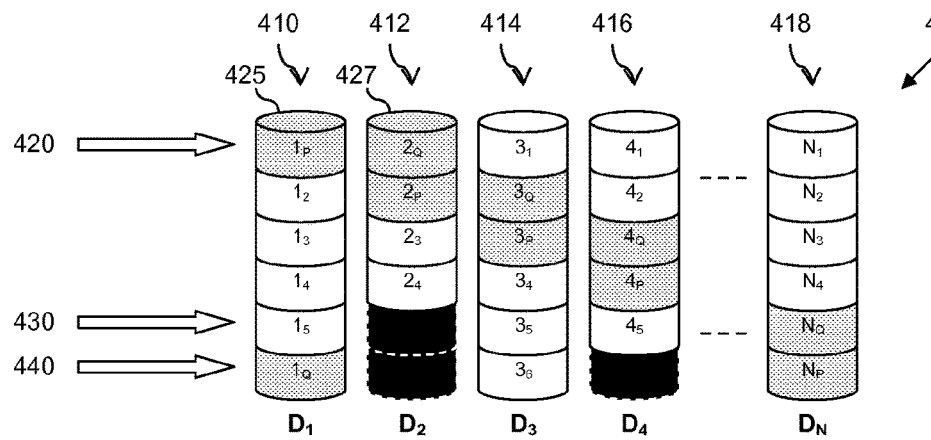
FIGS. 4 and 5 illustrate an alternative example of an array of data storage devices.

FIG. 4 illustrates an example of the distribution of data and data recovery bytes within an array 400 of data storage devices, such as may be implemented by the data storage array (RAID) controller 210 of FIG. 3. For the illustrated example, the array 400 comprises 'N' data storage devices 410, 412, 414, 416, 418. Blocks of data to be stored within the array 400 are 'striped' across the data storage devices, such that 'N−2' consecutive blocks of data 420 are distributed across 'N−2' of the 'N' data storage devices 410, 412, 414, 416, 418. For the example illustrated in FIG. 4, the remaining two data storage devices 410, 412, 414, 416, 418 store data recovery bits/words 425, 427 used to recover up to two of the (N−2) blocks of data of the corresponding stripe 420, should up to two data storage devices become 'unavailable', for example due to physical removal or otherwise fail and become inaccessible. In this manner, a RAID 6 type scheme has been implemented to perform striping and data recovery for the data stored within the array 400.

When a block of data is to be stored within the array 400, it is necessary for the data recovery bits/words 425, 427 to be re-calculated in order to take into account the new data. In the case of, say, one or more parity bits generated using a simple XOR comparison of the data across a 'stripe' of data storage devices 410, 412, 414, 416, 418, it may be sufficient to retrieve the relevant parity bit(s) and the data previously stored at the target address for the data to be written. Furthermore, it may be sufficient to update the parity bit(s) to take into account differences between the previous data and the new data, and to then write the data and updated parity bit(s) to the appropriate data storage device(s). However, for more complex data recovery techniques, such as using 'field theory' (for example a Galois field), it may be necessary to retrieve all blocks of data within the appropriate stripe across the array and to re-calculate the data recovery bits/words using all blocks of data (including the new data), and to then write the new data and update data recovery bits/words to the appropriate data storage devices. Thus, and as shown, in order to implement such a RAID type scheme, the writing of data to the array 400 typically requires one or more read operations to be performed to retrieve required data and/or recovery bits/words from the array, for data manipulation to be performed on the data to be written, the retrieved data and/or the recovery bits/words, and then for one or more write operations to be performed to store the new data and/or updated recovery bits/words in the appropriate data storage devices.

Referring back to FIGS. 2 and 3, when data is required to be written to the data storage array 220, the signal processing module 230 is arranged to provide the appropriate access command comprising the data to be written to the DDR module 260. The RAID controller 210 retrieves the access command from the DDR module 260, which is decoded by the command decoder 310. The command decoder 310 may then send the necessary read commands to the memory access module 320 in order to retrieve the required data (including any required recovery bits/words) from the data storage array 220. The retrieved data may then be made available to the data manipulation module 330, for example by way of the retrieved data being loaded into a buffer that is accessible by the data manipulation, such as buffer 335 illustrated in FIG. 3. In the case of the access command from the signal processing module 230, comprising a command to write new data to the data storage array 220, the command decoder 310 may also load the new data to be written to the data storage array 220 into the buffer 335. The data manipulation module 330 is then able to perform data manipulation on the retrieved data and/or new data, which may then be written to the appropriate data storage devices 222, 224, 226 along with the new data.

Referring back to FIG. 4, if the array 400 were to comprise data storage devices of different sizes such as data storage device D2 412 and data storage device D4 416, because these two smaller data storage devices have smaller address ranges, stripes of data blocks 430, 440 within the array 400 comprising address ranges beyond those available within data storage device D2 412 and data storage device D4 416 would comprise less than N data blocks. Thus, a manipulation module configured to perform data manipulation across N data blocks would not be able to correctly perform data manipulation across less than N data blocks without either being re-configured, or without having a separate data manipulation command stack. As such, in order to avoid a need to frequently re-configure the command stack for a data manipulation module and/or to provide multiple command stacks for a data manipulation module, data storage arrays such as implemented using RAID like schemes are typically limited to data storage devices of the same size.

In accordance with some examples, the data storage array controller 210 further comprises an address window controller 340 arranged to receive data storage device access commands, for example a read or write command to a data storage device within the data storage array 220. Upon receipt of a data storage device access command the address window controller 340 is arranged to compare a target address of the data storage device access command to an address window for a target storage device 222, 224, 226 of the data storage device access command. If the target address is outside of the address window for the target storage device 222, 224, 226, the address window controller 340 is arranged to block the data storage device access command. In this manner, by simply configuring address windows for individual data storage devices within the data storage array 220, read/write operations, etc. performed to those data storage devices that are outside of their respective address windows may be prevented. Specifically, by configuring address windows for data storage devices in accordance with their available address spaces, attempts to access unavailable address spaces (for example beyond an address range of a data storage device or for a data storage device that is no longer available) may be gracefully managed as described in greater detail below. In particular, such operations may be managed in a transparent manner with respect to the rest of the RAID controller 210.

For the illustrated example, the address window controller 340 may be operably coupled between the command decoder 310 and the memory access module 320 such that data storage device access commands from the command decoder 310 are conveyed to the memory access module 320 via the address window controller 340. Upon receipt of a data storage device access command, the address window controller 340 may be arranged to compare a target address of the data storage device access command to an address window for a target storage device 222, 224, 226 of the data storage device access command. If the target address is outside of the address window for the target storage device 222, 224, 226, the address window controller 340 may be configured to not forward the data storage device access command to the memory access module 320.

In accordance with some examples, upon receipt of a data storage device read command, the address window controller 340 may be arranged to compare a target address of the data storage device read command to an address window for a target storage device 222, 224, 226 of the data storage device read command. If the target address is outside of the address window for the target storage device 222, 224, 226, the address window controller may substitute pseudo data for data to be read for that data storage device read command. For example, if the target address is outside of the address window for the target storage device 222, 224, 226, the address window controller 340 may be arranged to make pseudo data available to the data manipulation module 330, for example by loading the pseudo data into the buffer 335, accessible by the data manipulation module 330, in place of data to be read from the data storage array 220. By substituting pseudo data that is known in advance (e.g. pre-defined data), subsequent recovery is made possible. In this manner, if a data manipulation operation that is to be performed relates to an unavailable address range for one or more data storage devices (for example beyond an address range of a data storage device or when a data storage device is no longer available), such as relating to one of the stripes of data blocks 430, 440 within the array 400 of FIG. 4, the address window controller 340 may substitute pseudo data for unavailable address spaces. The expected number of blocks of data may be provided to the data manipulation operation to allow it to perform the required data manipulation, without the need to re-configure a command stack or to provide multiple command stacks. Furthermore, by substituting known pseudo data for unavailable address spaces, predictable data manipulation may be performed, thereby enabling, say, data recovery to be subsequently performed based on that data manipulation.

The address window controller 340 may be operably coupled to a memory element, such as address window register 345 illustrated in FIG. 3, the address window register 345 being arranged to store address window configuration information therein. The address window controller 340 may further be arranged, and for example upon receipt of a data storage device access command from the command decoder 310, to identify a target storage device 222, 224, 226 of the data storage device access command. In response thereto, the address window controller 340 may retrieve address window configuration information corresponding to the identified target storage device 222, 224, 226 from the address window register 345. The address window controller 340 may then compare a target address of the data storage device access command to the retrieved address window configuration information for the target device. If the target address is outside of the address window (as defined by the address window configuration information) for the target storage device 222, 224, 226, the address window controller 340 may block the data storage device access command (e.g. not forward the data storage device access command to the memory access module 320), and in the case of a read command substitute pseudo data for the data to be read. In this manner, address windows for the data storage devices 222, 224, 226 may be configured by configuring their respective address window configuration information stored within the address window register 345. For example, in some embodiments, the address window register 345 may be externally configurable by, say, the signal processing module 230 of FIG. 2. In this manner, the address windows for the data storage devices 222, 224, 226 may be configured by, for example, the signal processing module 230, such configuration of the address windows for the data storage devices 222, 224, 226 being substantially transparent to the RAID controller 210, and in particular to the command decoder 310 and data manipulation module 330.

Figure 5:
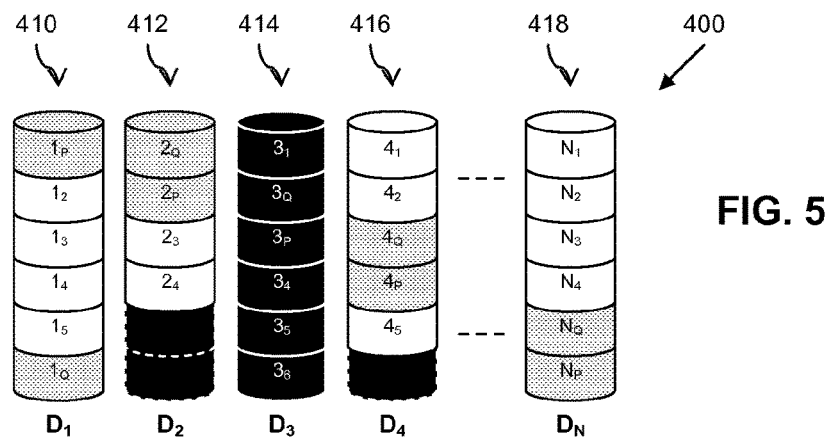

For example, the signal processing module 230 may be arranged to configure address windows for data storage devices 222, 224, 226 within the data storage array 220 in accordance with an initial arrangement of the data storage devices 222, 224, 226; the data storage devices 222, 224, 226 being capable of comprising different sizes/address ranges. If one of the data storage devices subsequently becomes unavailable due to, say, that data storage device becoming faulty or being physically removed or disconnected, such as illustrated for data storage device D3 414 in FIG. 5, the signal processing module 230 may be arranged to configure a 'null' address window for that unavailable data storage device (i.e. configuring the entire data storage device as being unavailable). Following such a re-configuration, pseudo data may be substituted in place of data from the unavailable data storage device. In this manner, the RAID controller 210 is capable of handling one or more data storage devices becoming unavailable without the need to reconfigure the command stack of the data manipulation module 330, or providing the data manipulation module 330 with multiple command stacks.

Significantly, data substitution and address window configuration may be performed substantially transparently with respect to the command decoder 310 memory access module, and the data manipulation module 330. In this manner, traditional decoding, memory access and data manipulation modules and code may be used to implement the data storage array controller 210, thereby facilitating and simplifying implementation of examples of the present invention, whilst maintaining the benefits therefrom.

Figure 6:
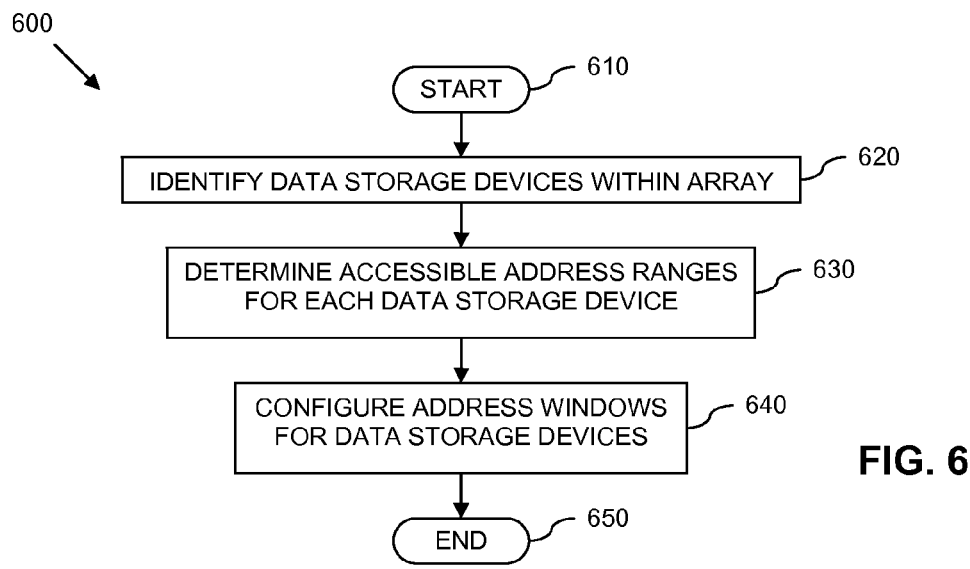

Referring now to FIGS. 6 to 11 there are illustrated simplified flowcharts of parts of an example of a method for providing data storage array functionality for at least one data storage array. Referring first to FIG. 6, there is illustrated a simplified flowchart 600 of an example of part of a method for providing data storage array functionality for at least one data storage array. The flowchart comprises configuring address windows for data storage devices within a data storage array in accordance with an initial arrangement of the data storage devices, such as may be performed by the signal processing module 230 of FIG. 2. Specifically, FIG. 6 illustrates example steps for initially configuring address windows for data storage devices within a data storage array in accordance with some example embodiments. The method starts at 610, and moves on to step 620 where data storage devices within the data storage array are identified. Next, accessible address ranges for the identified data storage devices are determined in step 630. For example, the expected accessible address ranges for the data storage devices may be stored within memory and accessible by the signal processing module 230 of FIG. 2. Next, at step 640, address windows for the data storage devices are configured in accordance with their determined accessible address ranges. For example, the signal processing module 230 may be operably coupled to an address window register, such as the address window register 345 illustrated in FIG. 3, and arranged to configure the address window information within the address window register. This part of the method then ends at step 650.

Figure 7:
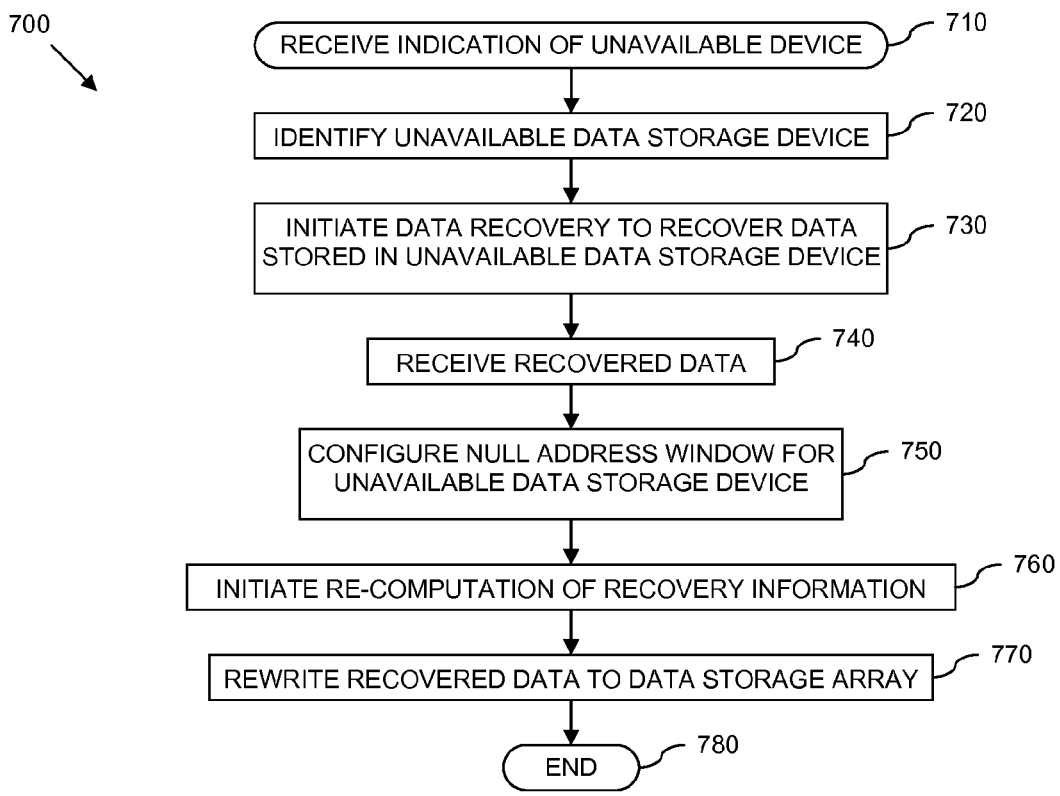

FIG. 7 illustrates an example of a simplified flowchart 700 of an alternative part of a method for providing data storage array functionality for at least one data storage array, such as may be performed by the signal processing module 230 of FIG. 2. This part of the method starts at step 710 with the receipt of an indication of a data storage device within the data storage array becoming unavailable. For example, an indication that a fault has been detected within the data storage device may be received. Alternatively, an indication that the data storage device has been physically removed or disconnected from the data storage array system may be received. Next, in step 720, the data storage device that has become unavailable is identified. Data recovery is then initiated to retrieve data that was stored within the data storage device that has become available, as shown in step 730. For example, the signal processing module 230 of FIG. 2 may send an array access command comprising a data recovery command to the RAID controller 210 of FIG. 2, instructing the RAID controller to perform data recovery for the unavailable data storage device. Upon receipt of the data recovery command, the command decoder 310 of FIG. 3 may decode the data recovery command and send to the memory access module 320 of FIG. 3 read commands in order for data and recovery information (e.g. parity bits/words) to be retrieved from the remaining data storage devices within the array. Such retrieved data and recovery information may then be provided to the data manipulation module 330 of FIG. 3, which is then able to recover the 'lost' information that was stored on the unavailable data storage device using the retrieved data and recovery information. The recovered data may then be provided back to the signal processing module 230 of FIG. 2. Upon receipt of the recovered data at step 740, the method moves on to step 750 where a null address window may be configured for the unavailable data storage devices excluding the one that need recovery, its data will be the manipulation result, for example by configuring respective information within the address window register 345 of FIG. 3, to enable data storage array functions to be correctly performed without the need to re-configure a command stack, or the need for multiple command stacks. Re-computation of recovery information may then be initiated at step 760 to take into account the current state of the data storage array (i.e. one less data storage device). For example, having re-configured the address window for the unavailable data storage device to null, the signal processing module 230 of FIG. 2 may send an array access command comprising a command to re-compute recovery information (e.g. parity bits/words) to the RAID controller 210. Recovered data is then re-written to the data storage array at step 770, and the method then ends at step 780.

Figure 8:
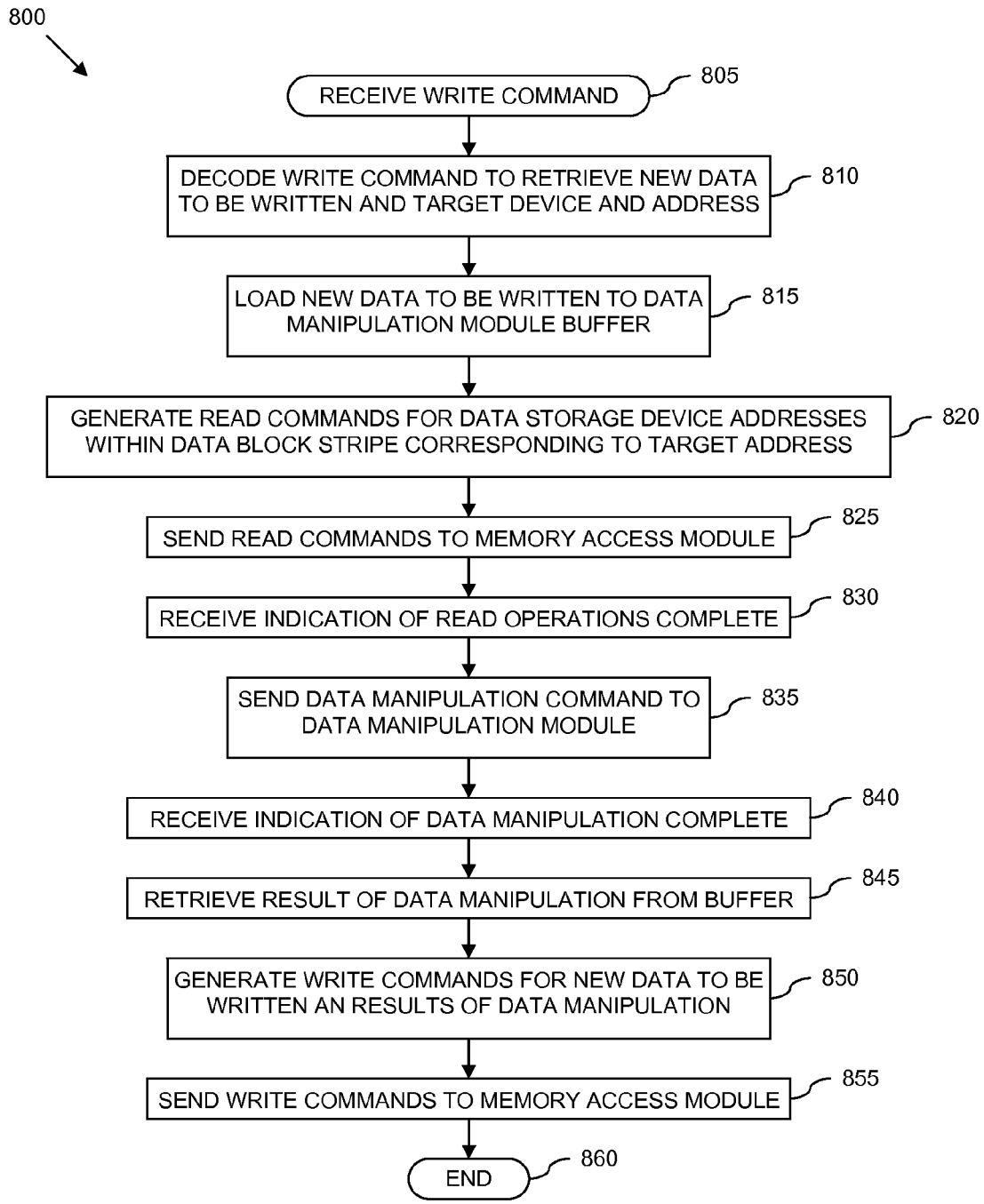

FIG. 8 illustrates an example of a simplified flowchart 800 of a further alternative part of a method for providing data storage array functionality for at least one data storage array, such as may be performed by a command decoder within a data storage array controller, such as the command decoder 310 of the RAID controller 210 of FIGS. 2 and 3. This part of the method starts at step 805 with the receipt of an array access command comprising a write command. Next, at step 810, the received write command is decoded to retrieve data to be written as well as retrieve target device and address information. The data to be written is then made available to a data modulation module, which for the illustrated example comprises loading the data to be written into a data manipulation module buffer, such as buffer 335 of FIG. 3, in step 815. Read commands are then generated in step 820 for data storage device addresses within a data recovery 'stripe', for example as illustrated at 420 in FIG. 4, corresponding to the target address. Next, in step 825, the read commands are sent to a memory access module to perform the read operations. Upon receipt of an indication that the read operations have been completed at step 830, the method moves on to step 835 where a data manipulation command is sent to the data manipulation module, instructing the data manipulation module to perform data manipulation to compute data recovery information, etc., for the new data to be written to the data storage array. Upon receipt of an indication that the data manipulation has been completed, at step 840, the result of the data manipulation is retrieved at step 845. Write commands are then generated for the new data and the result of the data manipulation at step 850. The write commands are then sent to the memory access module at step 855, and the method then ends at step 860.

FIG. 9 illustrates an example of a simplified flowchart 900 of a still further part of a method for providing data storage array functionality for at least one data storage array, such as may be performed by the address window controller 340 of FIG. 3. This part of the method starts at step 910 with a receipt of a read command. For example, as mentioned above for the example illustrated in FIG. 3, the address window controller 340 may be operably coupled between the command decoder 310 and the memory access module 320 such that data storage device access commands from the command decoder 310 are conveyed to the memory access module 320 via the address window controller 340. Accordingly, the address window controller 340 may receive a read command from the command decoder 310 intended for the memory access module 320. Next, at step 920, a target data storage device within the data storage array for the received read command may be identified. Address window information is then retrieved at step 930, for example from the address window register 345 illustrated in FIG. 3. A target address of the read command is then compared to an address window for the identified target storage device at step 940. If the target address for the read command is within the address window for the identified target data storage device, the method moves on to step 950, where the read command is forwarded on to the memory access module 320. Thereafter, the method ends at 980. However, if the target address for the read command is not within the address window for the identified target data storage device in step 940, the method moves on to step 960, where the read command is blocked (e.g. for the illustrated example the read command is not forwarded on to the memory access module). Pseudo data is then made available to the data manipulation module 330 in place of data to be read, at step 970, for example by way of loading the pseudo data into the data manipulation buffer 335 in FIG. 3. This part of the method then ends at step 980.

Figure 10:
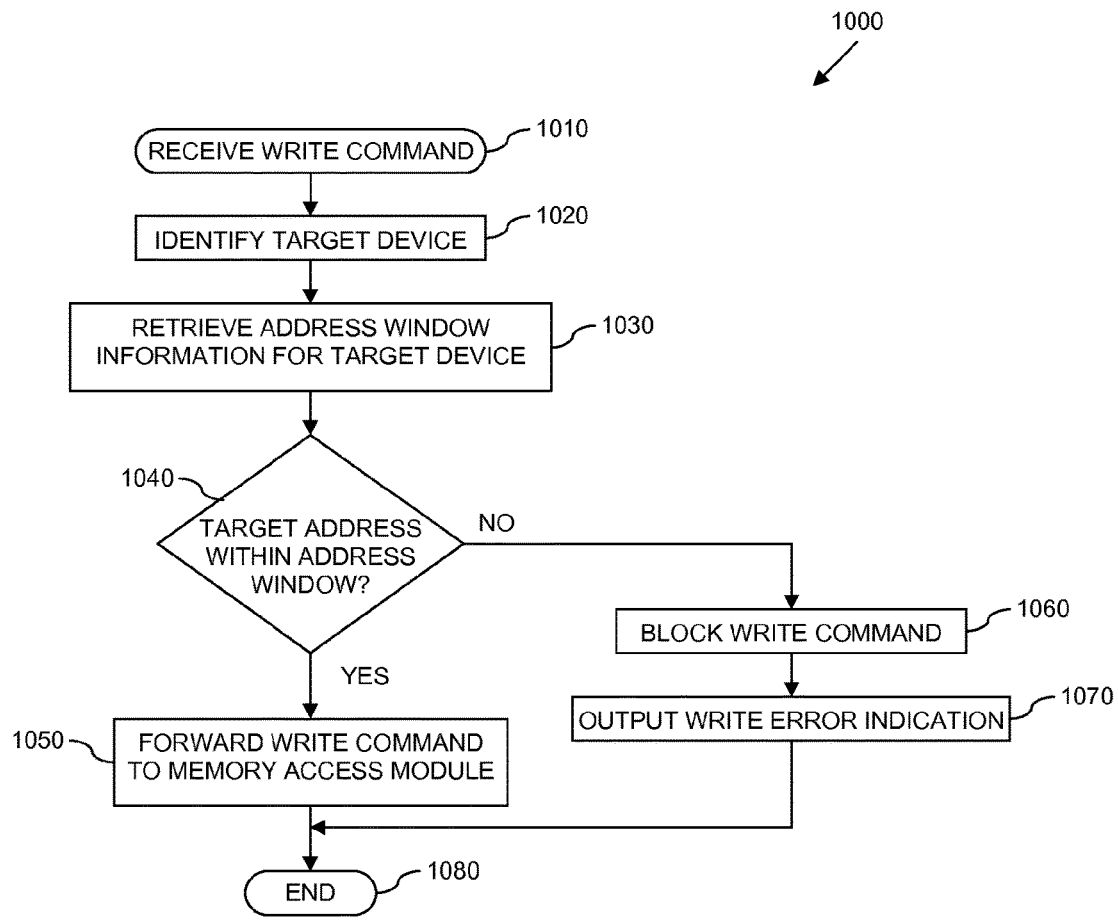

FIG. 10 illustrates an example of a simplified flowchart 1000 of a still further part of a method for providing data storage array functionality for at least one data storage array, such as may also be performed by the address window controller 340 of FIG. 3. This part of the method starts at step 1010 with the receipt of a write command. For example, the address window controller 340 may receive a write command from the command decoder 310 of FIG. 3 intended for the memory access module 320. Next, at step 1020, a target data storage device within the data storage array for the received write command is identified. Address window information is then retrieved at step 1030, for example from the address window register 345 illustrated in FIG. 3. A target address of the write command is then compared to an address window for the identified target storage device at step 1040. If the target address for the write command is within the address window for the identified target data storage device, the method moves on to step 1050, where the write command is forwarded on to the memory access module 320 of FIG. 3. Thereafter, the method ends at 1080. However, if the target address for the write command is not within the address window for the identified target data storage device, the method moves on to step 1060, where the write command is blocked (i.e. for the illustrated example the write command is not forwarded on to the memory access module). A write error indication is then output (for example provided back to the command decoder 310) at step 1070. This part of the method then ends at step 1080.

FIG. 11 illustrates an example of a simplified flowchart 1100 of a still further part of a method for providing data storage array functionality for at least one data storage array, such as may be performed by the data manipulation module 330 of FIG. 3. This part of the method starts at step 1110 with a receipt of an indication of required data manipulation. Next, at step 1120, data is retrieved, for example from a buffer such as the data manipulation buffer 335 illustrated in FIG. 3. Data manipulation is then performed using the data retrieved from the buffer in accordance with the received indication of required data manipulation, at step 1130. For example, such data manipulation may comprise manipulating the retrieved data to provide one or more of: data protection; code generation; data recovery; data mirroring; data striping; data redundancy; etc.

The result(s) of the data manipulation are then made available, for example by loading the results into a buffer such as the data manipulation buffer 335 of FIG. 3. An indication that the data manipulation has been completed is then output, for example to the command decoder 310 of FIG. 3, at step 1140, and the method ends at step 1150.

At least parts of the invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions, such as a particular application program and/or an operating system. The computer program may, for instance, include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein and that the scope of the invention is not limited to the shown examples.

For instance, for the illustrated examples a Redundant Array of Independent/Inexpensive Disks (RAID) system and a method therefor have been described to facilitate understanding of the inventive concept, and in particular a RAID 6 type system. However, these examples are not restricted solely to being implemented within such a RAID system, and example embodiments of the present invention may be implemented within any suitable data storage array system. Accordingly, example embodiments of a method and apparatus for providing data storage array functionality for at least one data storage array have been described which enable, in some examples, the implementation of at least one or more of: a flexible and configurable data storage array controller capable of providing data storage array functionality for data storage arrays comprising a range of data storage device types; a flexible and configurable data storage array controller capable of providing data storage array functionality for data storage arrays comprising a varying number of data storage devices; a flexible and configurable data storage array controller capable of being dynamically configured to provide data storage array functionality for data storage arrays comprising differing size data storage devices and/or varying numbers of data storage devices; and/or a flexible and configurable data storage array controller and application program code for execution on a signal processing module capable of being easily ported between different data storage array systems.

Furthermore, at least some examples of the present invention provide a data storage array controller hardware solution that may be easily integrated into an existing design and allow the data storage array controller to replace, in a totally autonomous manner, the missing data from any terminated sources. Application program code executed on a signal processing module may define and configure memory windows to enable the data storage array controller to replace missing/unavailable data (for example data storage disks or non homogeneous size sources) with pre-defined data. Since that data is known and prepared in advanced, recovery of data is possible.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for ease of understanding, the address window controller 340 has been illustrated and described as a stand-alone functional entity within the data storage array controller 210. However it will be appreciated that the address window controller 340 may equally form an integral part of one or more of the other functional components within the data storage array controller 210; for example the command decoder and/or memory access module.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
a data storage array controller comprising an address window controller to receive a data storage device access command, to compare a first target address of the data storage device access command to a first address window for a first target storage device of the data storage device access command, and, if the first target address is outside of the first address window, to block the data storage device access command, substitute pseudo data for data corresponding to the first target address of the first target storage device, and initiate data recovery to recover data stored at the first target address of the first target storage device using the pseudo data to re-compute recovery information, wherein the first target storage device is one of a plurality of data storage devices of a data storage array, and each of the plurality of data storage devices has a different size, wherein the address window controller configures address windows for each of the plurality of data storage devices based on each of the different sizes.

2. The integrated circuit device of claim 1 wherein, upon receipt of a data storage device read command, the address window controller is further to compare a second target address of the data storage device read command to a second address window for a second target storage device of the data storage device read command, and if the second target address is outside of the second address window for the second target storage device, to substitute the pseudo data for data to be read for that data storage device read command, wherein the second address window is associated with a second size of the second target storage device.

3. The integrated circuit device of claim 2 wherein the data storage array controller further comprises a command decoder to receive an array access command, and upon receipt of the array access command to generate the data storage device access command in accordance with the received array access command.

4. The integrated circuit device of claim 3 wherein the data storage array controller further comprises a memory access module to receive the data storage device access command, and to perform an access operation on the data storage array in accordance with the data storage device access command.

5. The integrated circuit device of claim 4 wherein the address window controller is operably coupled between the command decoder and the memory access module such that the data storage device access command from the command decoder is conveyed to the memory access module via the address window controller.

6. The integrated circuit device of claim 4 wherein the data storage array controller further comprises a data manipulation module to perform data manipulation in accordance with the array access command, and the memory access module is further to make available to the data manipulation module data read from the data storage array in accordance with the data storage device read command.

7. The integrated circuit device of claim 6 wherein the address window controller is further to make available to the data manipulation module the pseudo data in place of data to be read from the data storage array if the second target address for the data to be read from the second target storage device is outside of the second address window for the second target storage device.

8. The integrated circuit device of claim 6 wherein the memory access module is further to perform read operations from the data storage array in accordance with the data storage device read command, and to load read data resulting from such read operations into a buffer accessible to the data manipulation module.

9. The integrated circuit device of claim 8 wherein the address window controller is further configured to load the pseudo data into the buffer accessible to the data manipulation module in place of data to be read from the data storage array if the second target address for the data to be read from the second target storage device is outside of the second address window for the second target storage device.

10. The integrated circuit device of claim 6 wherein the data manipulation module is further to perform, on data made available there to, in accordance with the array access command, one from a group consisting of: data protection; code generation; data recovery; data mirroring; data striping; and data redundancy.

11. The integrated circuit device of claim 3 wherein the address window controller is operably coupled to an address window register arranged to store address window information, and upon receipt of the data storage device access command from the command decoder, to store the first address window to the address window register.

12. The integrated circuit device of claim 11 wherein the address window controller is arranged to:
   identify the first target storage device of the data storage device access command;
   retrieve the address window information corresponding to the identified target storage device from the address window register;
   compare the first target address of the data storage device access command to the retrieved address window information; and
   if the first target address is outside of the address window for the first target storage device, block the at least one data storage device access command.

13. The integrated circuit device of claim 11 wherein the address window register comprises a configurable memory element capable of having its contents configured by a device external to the data storage array controller.

14. A data storage array system comprising:
   a data storage array controller comprising an address window controller to receive a data storage device access command, and upon receipt of the data storage device access command, to compare a target address of the data storage device access command to an address window for a target storage device of the data storage device access command and if the target address is outside of the address window for the target storage device, to block the data storage device access command, substitute pseudo data for data corresponding to the target address of the target storage device, and initiate data recovery to recover data stored at the target address of the target storage device using the pseudo data to re-compute recovery information, wherein the target storage device is one of a plurality of data storage devices of a data storage array, and each of the plurality of data storage devices has a different size, wherein the address window controller configures address windows for each of the plurality of data storage devices based on each of the different sizes.

15. The data storage array system of claim 14 wherein the data storage array system comprises a signal processing module operably coupled to the data storage array controller, the signal processing module to provide array access commands to the data storage array controller.

16. The data storage array system of claim 15 wherein the address window controller is operably coupled to an address window register, the address window register to store address window information, and the signal processing module is further to configure the address window information within the address window register.

17. The data storage array system of claim 16 wherein, upon determination that a data storage device within the data storage array has become unavailable, the signal processing module is further to configure a null address window for the unavailable data storage device.

18. A method for providing data storage array functionality for a data storage array, the method comprising:
   receiving a data storage device access command for performing an access operation with the data storage array;
   comparing a target address of the data storage device access command to an address window for a target storage device of the data storage device access command, wherein the target storage device is one of a plurality of data storage devices, and each of the plurality of data storage devices has a different size, wherein the address window controller configures address windows for each of the plurality of data storage devices based on each of the different sizes;
   if the target address is outside of the address window for the target storage device, blocking the data storage device access command;
   substituting pseudo data for data corresponding to the target address of the target storage device; and
   initiating data recovery to recover data stored at the target address of the target storage device using the pseudo data to re-compute recovery information.

19. The method of claim 18 further comprising:
   providing, by a signal processing module coupled to a data storage array controller, array access commands to the data storage array controller.

20. The method of claim 19 further comprising:
   storing, by an address window register coupled to an address window controller, address window information; and
   configuring, by the signal processing module, the address window information within the address window register.

* * * * *